United States Patent [19]

Bailly

[11] Patent Number: 5,783,933

[45] Date of Patent: Jul. 21, 1998

[54] SWITCHING SUPPLY DEVICE

[75] Inventor: Alain Bailly, Simiane Collongue, France

[73] Assignee: SGS-Thomson Microelectronics S.A., Saint Genis, France

[21] Appl. No.: 759,157

[22] Filed: Dec. 3, 1996

[30] Foreign Application Priority Data

Dec. 7, 1995 [FR] France .................................. 95 15587

[51] Int. Cl.[6] .................................. G05F 1/40; G05F 1/42; G05F 1/10; H02M 7/155

[52] U.S. Cl. .................... 323/282; 323/285; 323/288; 323/222; 363/89

[58] Field of Search .................... 323/282, 288, 323/285, 222; 363/89, 65, 131; 315/291, 208

[56] References Cited

U.S. PATENT DOCUMENTS

| | | | |
|---|---|---|---|
| 5,003,454 | 3/1991 | Bruning | 363/81 |
| 5,416,387 | 5/1995 | Cuk et al. | 315/209 |
| 5,442,539 | 8/1995 | Cuk et al. | 363/89 |
| 5,532,918 | 7/1996 | Mayrand et al. | 363/89 |

OTHER PUBLICATIONS

French Search Report from French Patent Application No. 95 15587, filed Dec. 7, 1995.

IEE Proceedings B, Electrical Power Applications, vol. 138, No. 6 Part B, Nov. 1, 1991, pp. 338-344, Itoh, R., et al., "Single-Phase Sinusoidal Rectifier With Step-Up/Down Characteristics".

Power Electronics, Maui, Nov. 15-19, 1993, vol. 2, Nov. 15, 1993, Institute Of Electrical And Electronics Engineers, pp. 965-970, Dos Reis F. S., et al., "Characterization Of Conduction Noise Generation For Sepic, CUK and Boost Converters Working as Power Factor Preregulators".

Primary Examiner—Peter S. Wong
Assistant Examiner—Rajnikant B. Patel
Attorney, Agent, or Firm—Wolf, Greenfield & Sacks, P.C.; James H. Morris; Richard F. Giunta

[57] ABSTRACT

Disclosed is a switching supply device having a power factor close to unity. The device is characterized by its limited number of components, namely only one power switch, only one control circuit and basic components. Application to power supplies for fluorescent lamps (lighting).

55 Claims, 4 Drawing Sheets

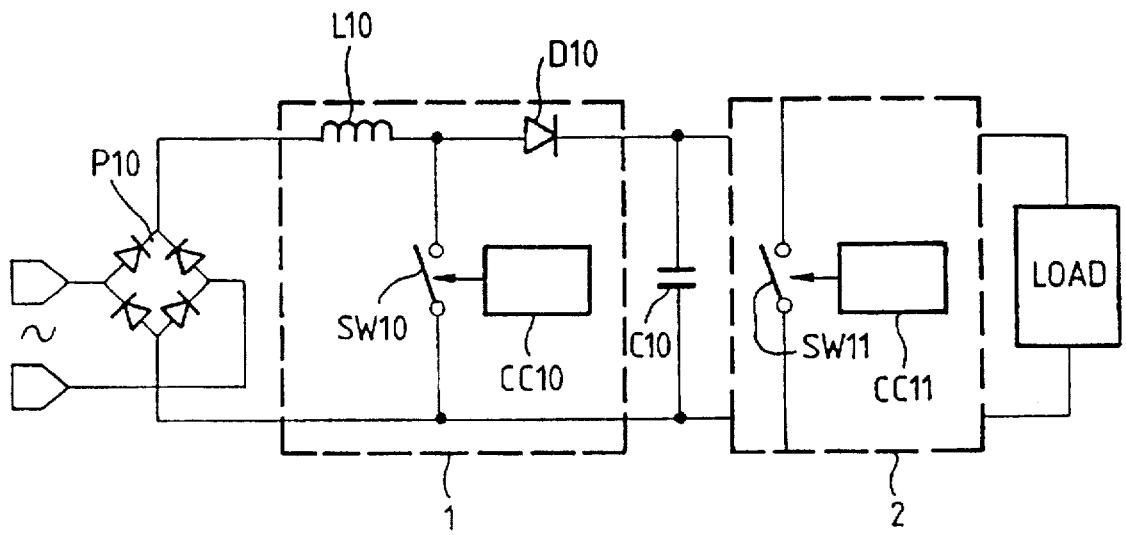
FIG_1
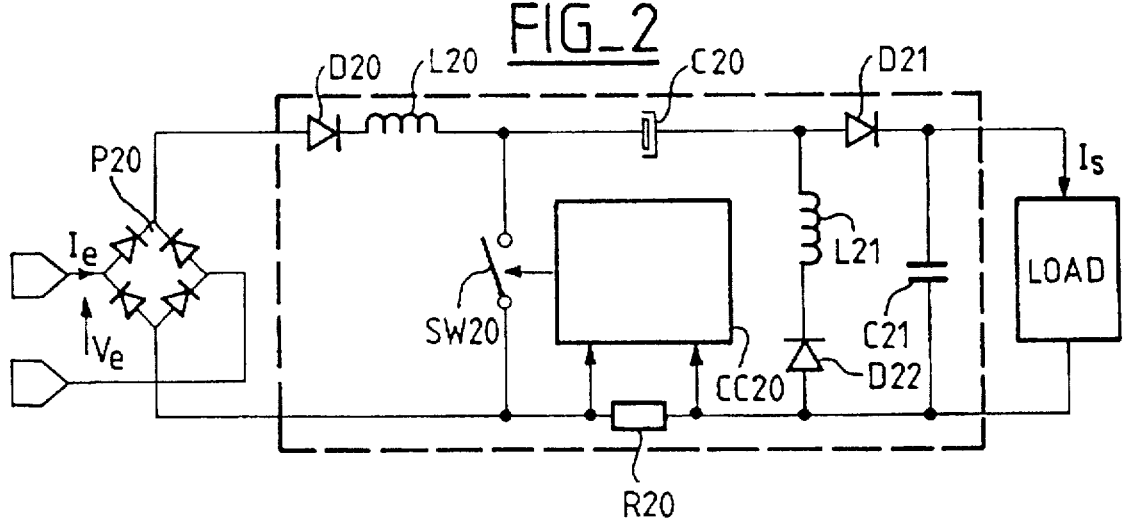
FIG_2
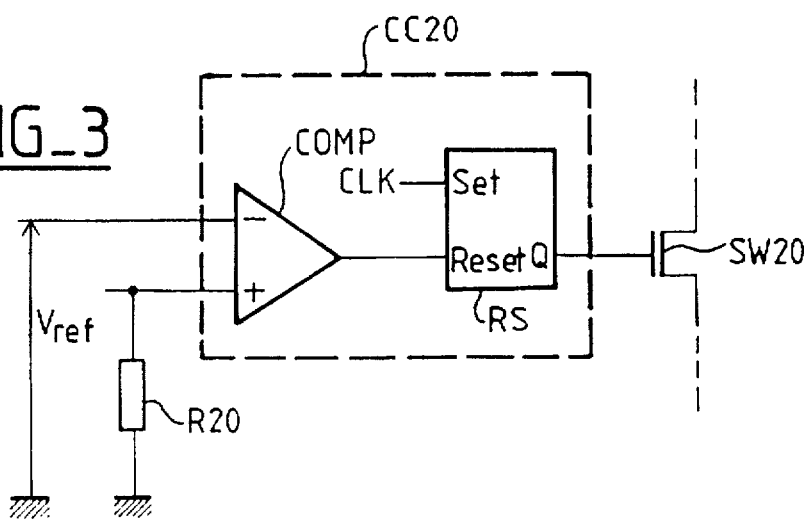
FIG_3

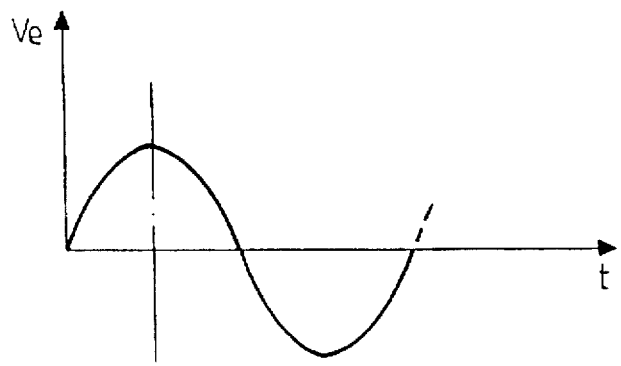
FIG_4a
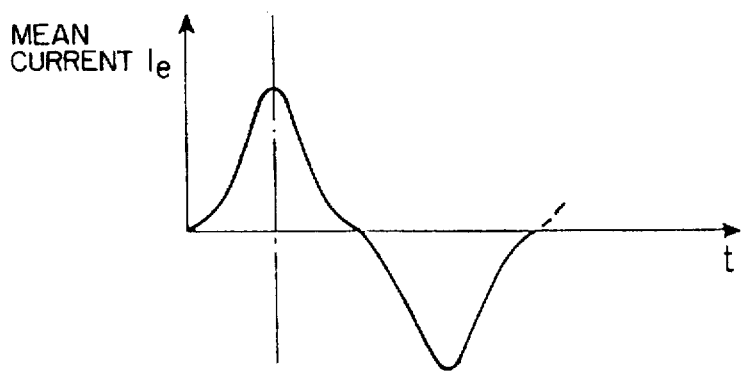
FIG_4b
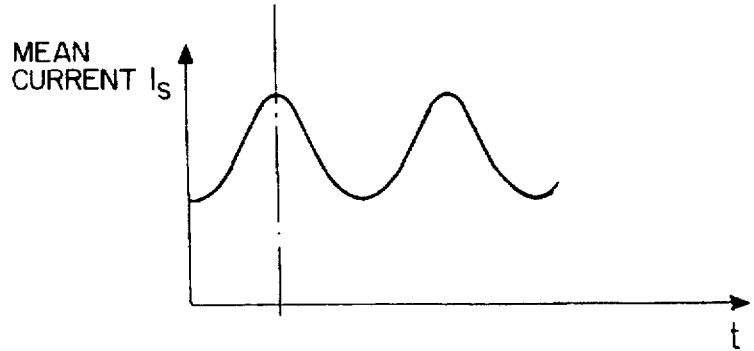
FIG_4c
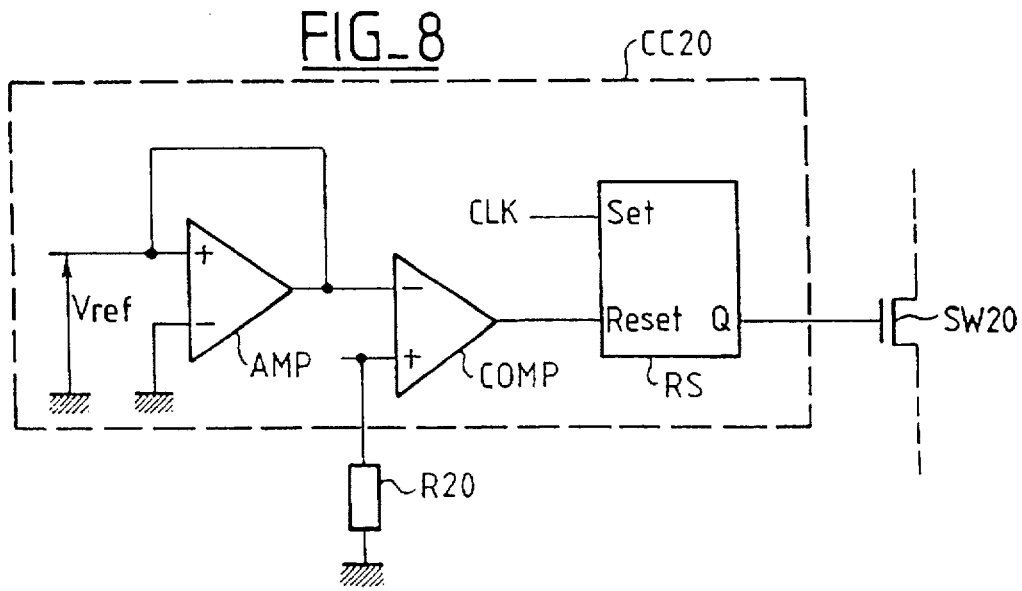
FIG_8

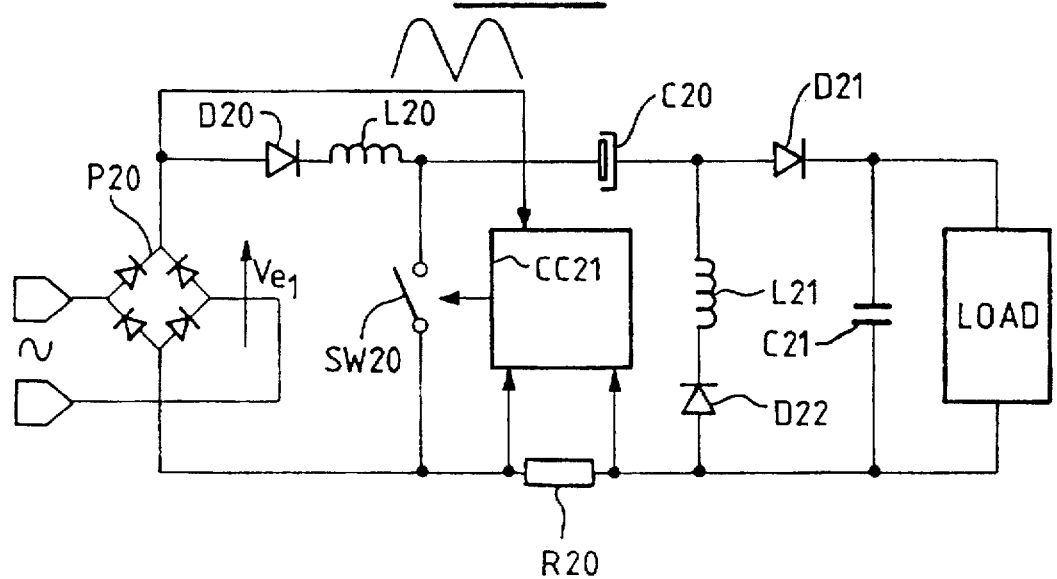
FIG_5
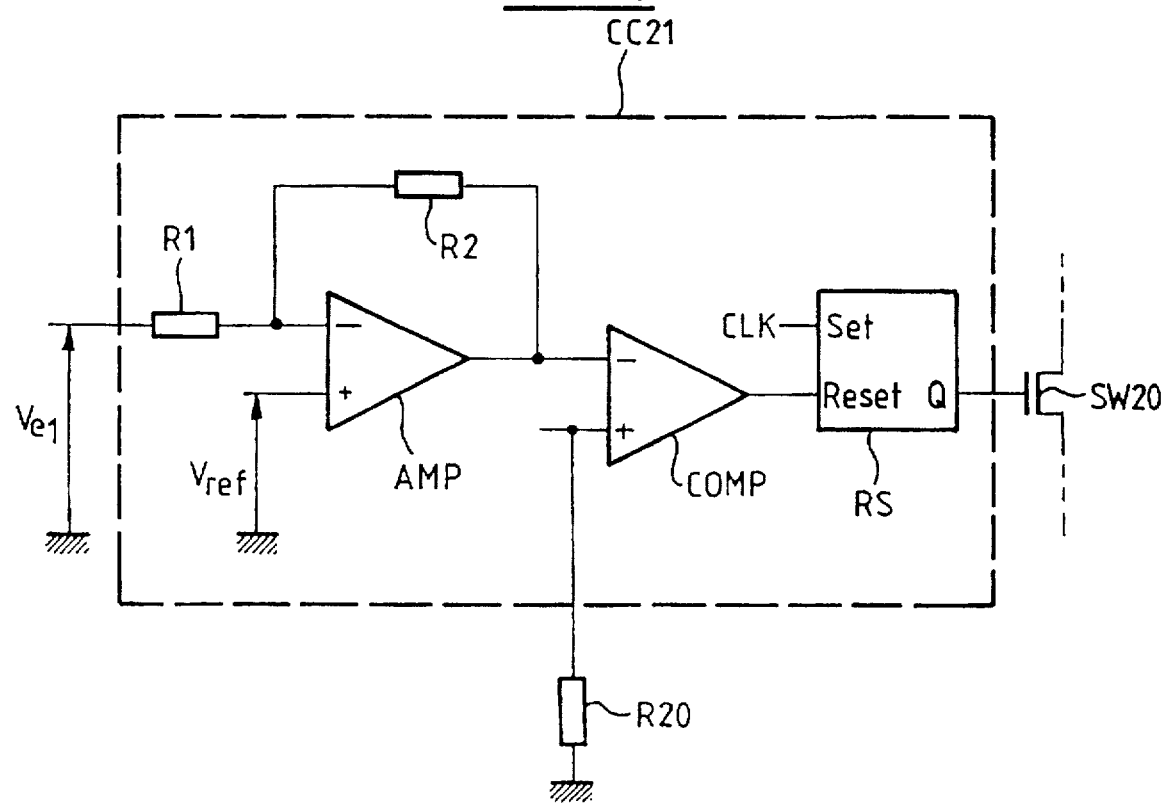
FIG_6

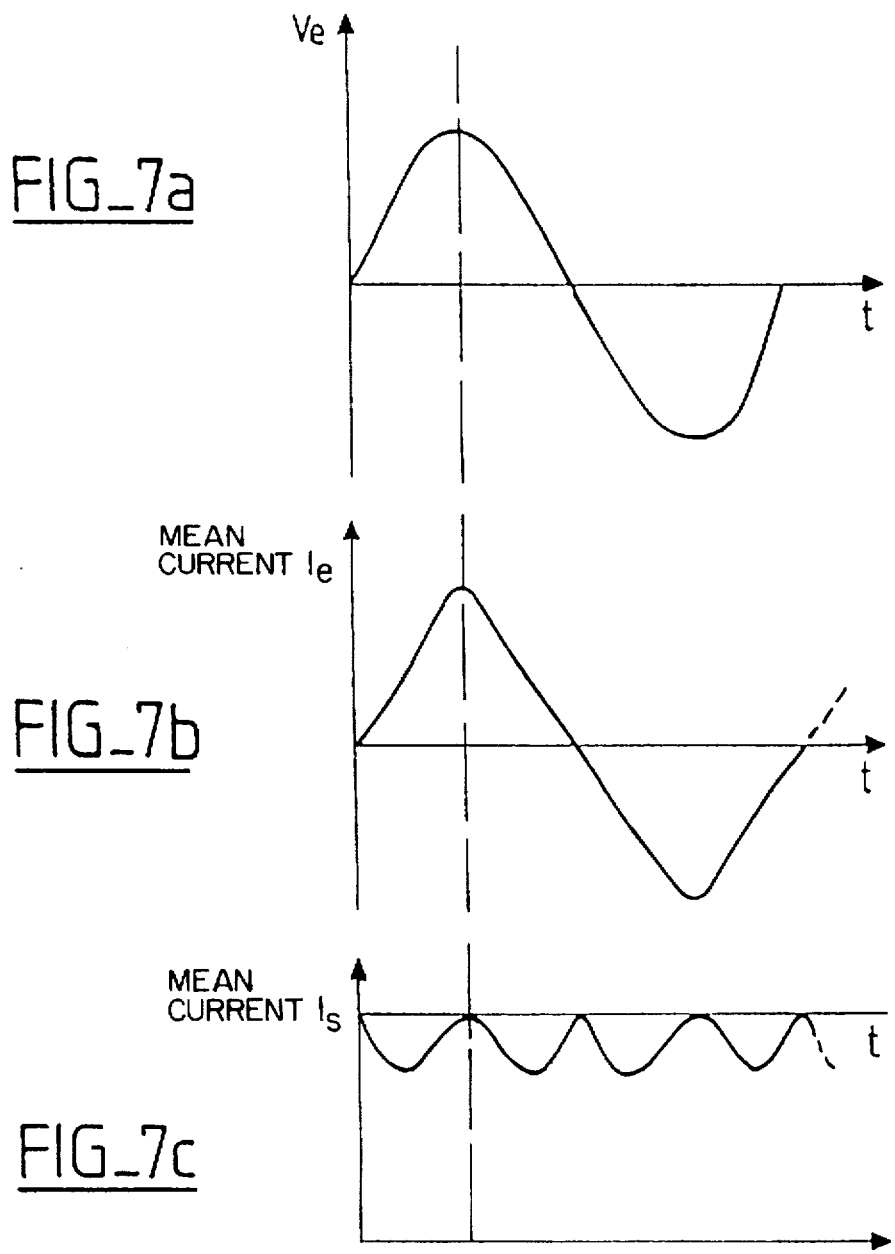

5,783,933

SWITCHING SUPPLY DEVICE

BACKGROUND OF THE INVENTION

1. Field of the Invention

The invention relates to a switching supply device. It can be applied particularly, although not exclusively, to the field of lighting.

2. Discussion of the Related Art

Conventionally, a switching supply device is a non-insulated structure. It uses an AC main supply to produce a DC voltage to supply electronic circuits such as those used in fluorescent lamps. It is formed primarily of a current regulator. Current regulators are typically implemented with switching supply regulators because they have high efficiency and dissipate little energy at the corresponding power switch.

The qualities expected of a switching supply device include obtaining a power factor close to unity. The power factor is the ratio of the real power to the total apparent power. For an AC main supply network, the power factor is the cosine of the phase angle between the current and the voltage.

The type of switching supply regulator most commonly used to ensure a high power factor consists of a voltage boost circuit followed by a switching supply circuit, with a filtering capacitor disposed between these two circuits. The voltage boost circuit comprises an inductor, for which the energy transfer is controlled by a power switch. A signal to open or close the power switch is provided by a control circuit. The voltage boost circuit makes it possible to obtain a high regulated output voltage at the terminals of the filtering capacitor. This output voltage is applied to the switching supply circuit, to servo-link it to a reference voltage level.

FIG. 1 provides a schematic illustration of this type of switching supply device, which comprises a voltage boost circuit 1, a filtering capacitor C10 and a switching supply circuit 2.

The voltage boost circuit 1 is connected at its inputs to the two output terminals of a rectifier circuit P10 and at its outputs to the two terminals of the filtering capacitor C10. It comprises an induction coil L10 series-connected with a diode D10, the assembly being connected between the positive terminal of the rectifier circuit P10 and the positive terminal of the filtering capacitor C10. The anode of the diode D10 is connected to the induction coil L10.

The voltage boost circuit further has a power switch SW10 connected between the anode of the diode D10 and the neutral line of the rectifier circuit P10. The negative terminal of the filtering capacitor C10 is also connected to the neutral line of the rectifier circuit. A control circuit CC10 controls activation of the power switch SW10.

The regulated high voltage obtained at the terminals of the filtering capacitor C10 is applied to the switching supply circuit 2 to reduce it to a given voltage level. This switching supply circuit has a power switch SW11 and the control circuit CC11 pertaining thereto. The structure of this circuit is not described in detail in this description for it is well known to those skilled in the art.

The general operation of a switching supply device such as shown in FIG. 1 is as follows:

During a period $T_{on1}$, the power switch SW10 is closed. The diode D10 is off and the induction coil L10 stores energy. Then, during a period $T_{off1}$, the power switch SW10 is off. The diode D10 comes on and there is a transfer of power between the induction coil L10 and the capacitor C10. Thus, a high voltage is obtained at the terminals of the filtering capacitor C10 that is greater than the peak voltage of the input signal.

This voltage is then servo-linked to a lower reference voltage by the switching supply circuit 2.

This type of regulator makes it possible to obtain a regulated voltage at output with a low ripple rate. However, the quality of the regulation at output is not essential in many applications. For example, the voltage applied to the terminals of the control device of a fluorescent lamp may fluctuate without disturbing the operation of the lamp.

By contrast, the quality of the power factor can be a decisive element in the choice of the switching supply device.

In the example of FIG. 1, the quality factor of the switching supply device is high, in the range of 0.98.

Supply devices such as those described above are very costly because they require a large number of components: two power switches SW10, SW11 and the control circuits CC10, CC11 pertaining thereto.

SUMMARY OF THE INVENTION

According to one embodiment of the invention, a supply device to receive a rectified AC input voltage from a rectifier circuit between a first input and a second input terminal is disclosed. According to this embodiment, the supply device comprises a first diode having an anode, coupled to the first input terminal, and a cathode; a power switch having an input to receive a control voltage that activates the power switch; a control circuit that generates the control voltage; a first induction coil coupled in series with the power switch between the cathode of the first diode and the second input terminal; a first capacitor having a positive electrode, coupled to a midpoint of the first induction coil, and a negative electrode, the first capacitor to provide a substantially constant voltage across the positive and negative electrodes; a second diode having an anode and a cathode; a second induction coil coupled to the negative electrode of the first capacitor and to the cathode of the second diode; a measurement resistor coupled between the anode of the second diode and the second input terminal; a second capacitor having a negative electrode, coupled to the anode of the second diode, and a positive electrode; and a third diode having an anode coupled to the negative electrode of the first capacitor and a cathode coupled to the positive electrode of the second capacitor.

According to another embodiment of the invention, a power supply circuit for providing power to a load from an alternating current supply is disclosed. According to this embodiment, the power supply circuit comprises a rectifier to rectify a power signal received from the alternating current supply; first and second output terminals to provide power to the load; a first energy storage element coupled to the rectifier; a second energy storage element, coupled to the first energy storage element, to receive energy from the first energy storage element and transfer the energy to the load; and a single power switch.

According to another embodiment of the invention, a supply circuit is disclosed.

According to this embodiment, the supply circuit comprises first and second input terminals; first and second output terminals; an inductor coupled to the first and second input terminals and parallel with the first and second output terminals; and a current control circuit, to control a current through the inductor.

According to another embodiment of the invention, a supply circuit is disclosed, the supply circuit comprising: first and second input terminals; first and second output terminals; an energy storage circuit; and a current control circuit, to limit current flowing through the energy storage circuit to a reference amount.

According to another embodiment of the invention, a supply circuit is disclosed, the supply circuit comprising: first and second input terminals; first and second output terminals; an energy storage circuit; and means for limiting current passing through the energy storage circuit to a reference amount.

According to another embodiment of the invention, a method of supplying power to a load from an input power source is disclosed. According to this embodiment, the method comprises steps of: delivering current from the input power source to an energy storage device; limiting the amount of current passing through the energy storage device to a reference amount; and providing energy stored in the energy storage device to the load.

According to another embodiment of the invention, a method of supplying power to a load from an AC power supply is disclosed. According to this embodiment, the method comprises steps of: charging a first energy storage element from the AC power supply; discharging the first energy storage element into a second energy storage element; discharging the second energy storage element into a third energy storage element; and supplying power from the third energy storage element to the load.

BRIEF DESCRIPTION OF THE DRAWINGS

Other advantages and characteristics of the invention are presented in the appended description for illustration purposes and in no way restrict the scope of the invention or claims, the description being provided with reference to the appended figures, of which:

FIG. 1 is a diagram of a known switching supply device;

FIG. 2 is a diagram of a first switching supply device according to the invention;

FIG. 3 is a diagram of a control circuit pertaining to the device of FIG. 2;

FIGS. 4a, 4b and 4c are temporal curves of the input and output signals pertaining to the device of FIG. 2;

FIG. 5 is a diagram of a second switching supply device according to the invention;

FIG. 6 is a diagram of a control circuit pertaining to the device of FIG. 5;

FIGS. 7a, 7b and 7c are temporal curves of the input and output signals pertaining to the device of FIG. 5;

FIG. 8 is a variant of the control circuit pertaining to the device of FIG. 2.

DETAILED DESCRIPTION

FIG. 2 is a diagram of a first exemplary embodiment of a supply device according to the invention.

The supply device is connected to the output terminals of a rectifier circuit, illustrated in the present case by a diode bridge P20, and to the terminals of a load referenced LOAD.

The device includes a diode D20 connected in series with an induction coil L20 and a power switch SW20, the assembly being connected between the two output terminals of the rectifier circuit. The power switch SW20 receives an activation signal coming from a control circuit CC20. The diode D20 has an anode connected to the rectifier circuit and a cathode connected to the induction coil L20.

Furthermore, a branch including a capacitor C20, which may be a chemical capacitor, series-connected with a second induction coil L21, a diode D22 and a resistor R20 is parallel-connected with the power switch SW20. The capacitor C20 may be connected to the midpoint of the induction coil L20. The capacitor C20 fulfils the role of an energy reservoir when the input voltage is zero. Furthermore, the voltage at its terminals may remain substantially constant during the operation of the supply device for a fixed peak value of voltage coming from the rectifier circuit P20.

The anode of the diode D22 is connected to the measurement resistor R20. The capacitor C20 may be a chemical capacitor and the value of its capacitance may be in the range of approximately ten to ninety microfarads.

The resistor R20 is a resistor of very low value. It enables measurement of the current flowing through the induction coil L21 when the power switch SW20 is closed. The diodes D20 and D22 are biased so as to prevent a reversal of current respectively in the induction coils L20 and L21, when the induction coils are completely demagnetized.

The supply device further includes a diode D21 series-connected with a second capacitor C21, the assembly being placed in parallel at the terminals of the second induction coil L21. The diode D21 is biased in such a way that it enables a current coming from the induction coil L21 to charge the capacitor C21 when the power switch SW20 is open. Finally, the load circuit LOAD is connected to the terminals of the capacitor C21.

The power switch SW20 may be a MOSFET type power transistor. It receives an activation signal coming from a control circuit CC20, such as the one shown in FIG. 3.

In the present example, the control circuit CC20 is a pulse width modulator delivering the activation signal of the power switch SW20. This control circuit shall be described in detail in FIG. 3.

The working of the supply device of FIG. 2 is as follows: during a period $T_{on}$, the power switch SW20 is closed. The induction coils L20 and L21 store energy and the diode D21 is off. The voltage at the terminals of the chemical capacitor C20 remains constant and the current flowing through the induction coil L21 increases with a constant slope.

The value of the set of passive components of the device is chosen in such a way that the induction coil L20 is completely demagnetized at each new period of the activation signal (a discontinuous mode).

During $T_{off}$, the power switch SW20 is open. There is a transfer of energy from the induction coil L20 to the capacitor C20 and from the induction coil L21 to the capacitor C21.

The output voltage of the device is then applied to the terminals of the load circuit LOAD. The performance characteristics of the device is described below with reference to FIGS. 4a, 4b and 4c.

FIG. 3 illustrates an exemplary embodiment of the control circuit CC20, and includes a pulse width modulator. This modulator is used in current mode. That is, measurement of the current through the resistor R20 determines the value of the cyclical ratio of the activation signal for the switch. It should be noted that the current flowing through the measurement resistor R20 during $T_{on}$ corresponds to the current flowing through the induction coil L21.

The control circuit CC20 comprises a voltage comparator COMP receiving a reference voltage $V_{ref}$ at its negative input and the voltage present at a terminal of the resistor R20 at its positive input. The output of the comparator COMP is connected to the Reset input of an RS flip-flop circuit. This flip-flop circuit receives a clock signal CLK coming from an internal clock at its Set input and delivers the power switch activation signal SW20 at its Q output.

In the embodiment shown, the frequency of the clock signal is very high, far higher than the frequency of the signal coming from the AC main supply network. Furthermore, the internal clock, the circuit preparing the reference voltage, the comparator and the flip-flop circuit can be made on a single integrated circuit with the rest of the switching supply device. To adjust the frequency of the internal clock, the integrated circuit may be connected to an external RC network.

The control circuit works as follows: at the outset, a clock stroke places the Q output of the flip-flop circuit at 1 and the power switch SW20 is closed. The voltage at the terminals of the capacitor C20 is at the terminals of the induction coil L21. For a fixed peak value of the input voltage, the voltage at the terminals of the induction coil L21 is relatively constant and the current flowing through it increases linearly. The current flowing in the resistor R20 therefore increases in the same way and, when the voltage at its terminals reaches the reference voltage $V_{ref}$, the Q output of the RS flip-flop changes its state and the switch opens. A constant cyclical ratio is obtained.

Should the peak value of the input voltage vary and go, from example, from 220 to 230 volts, the cyclical ratio would vary during this transition.

FIGS. 4a, 4b and 4c respectively represent the input voltage Ve and the mean input current Ie of the rectifier circuit, and the mean output current Is of the device. It may be observed that the current Ie is not sinusoidal and that the mean output current Is has a fairly high ripple rate. Owing to the substantial deformation of the curve of the mean input current, the power factor of the supply device is thereby slightly reduced. This deformation of the curve of the current is to a great extent due to the greater time of demagnetization of the induction coils when the input voltage is high.

However, if these curves are examined, it can be seen that the value of the power factor remains high and is equal to 0.98. Furthermore, the third harmonic in the mean input current Ie amounts to 30% of the fundamental harmonic. With regard to the mean output current, its ripple rate is fairly high, in the range of 40%.

Despite the high power factor of the device, it is possible to further improve the performance characteristics of the above embodiment.

To this end, it is proposed to vary the cyclical ratio of the activation signal as a function of the amplitude of the input voltage of the device. To do this, the control circuit of the power switch SW20 may be modified so that the waveform of the mean input current approaches a sinusoidal form.

This may be accomplished by reducing the mean input current when the input voltage is high. For this purpose, the cyclical ratio of the power switch activation signal may be reduced when the input voltage is close to its peak value. Conversely, the cyclical ratio may be increased when the input voltage is low.

To vary the cyclical ratio of the activation signal, the control circuit for the power switch is modified. FIG. 5 illustrates a supply device in which the activation signal coming from the control circuit CC21 varies as a function of the voltage at the output of the rectifier circuit.

FIG. 6 illustrates a pulse width modulator delivering an activation signal whose cyclical ratio is a function of the input voltage. This modulator is identical to that presented in FIG. 3, but with an input stage added in order to modify the reference voltage of the comparator COMP.

This input stage is an inverter assembly formed by an operational amplifier AMP whose output is looped to the negative input by means of a resistor R2. Furthermore, the reference voltage $V_{ref}$ is applied to the positive input of the operational amplifier AMP as the input voltage $V_{e1}$ coming from the rectifier circuit P20 is applied to the negative input of this operational amplifier AMP through a resistor R1.

The resistors R1 and R2 are sized so that the inverter amplifier has a very low gain of the order of 0.01. This assembly is used to cause variation in the reference voltage applied to the negative input of the voltage comparator COMP.

When the input voltage $V_{e1}$ is close to zero, the output voltage of the amplifier is substantially equal to the reference voltage $V_{ref}$. For any other value of input voltage, the output voltage is lower in magnitude than the reference voltage $V_{ref}$. This variation of the reference threshold of the comparator COMP then gives rise to variation of the cyclical ratio of the activation signal.

FIGS. 7a and 7b respectively show the input voltage and the mean input current upline, with respect to the rectifier circuit. FIG. 7c shows the mean output current of the supply device.

As compared with the curves of FIGS. 4a, 4b and 4c, it can be seen that the device of FIG. 5 enables an improvement of the power factor and the ripple rate of the output current. The power factor of the improved device is 0.99 and the third harmonic of the mean input current represents 12% to 14% of the fundamental harmonic. With regard to the mean output current, its ripple rate is reduced to 25% of the peak value of the output current.

In one embodiment, for a root mean square input voltage equal to 230 volts, and in order to obtain a power of 40 watts at output for a voltage of 110 volts, the sizing of the elements of the device is as follows: L20=550 µH, L21=730 µH and C20=22 µF.

Finally, FIG. 8 describes a second exemplary pulse width modulator CC20 delivering an activation signal whose cyclical ratio is constant for a fixed peak value of input voltage. This circuit is derived from the diagram of the modulator CC21 of FIG. 6. To obtain a fixed reference voltage at the negative input of the voltage comparator COMP, the input stage is converted into a follower assembly.

Having thus described at least one illustrative embodiment of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A supply device to receive a rectified AC input voltage from a rectifier circuit between a first input terminal and a second input terminal, the rectified AC input voltage having a peak input voltage, said supply device comprising:

a first diode having an anode, coupled to the first input terminal, and a cathode;

a first induction coil having a first terminal coupled to the cathode of the first diode, and a second terminal;

a power switch coupled between the second terminal of the first induction coil and the second input terminal of the supply device, and having an input to receive a control voltage that activates the power switch;

a control circuit that generates the control voltage;

a first capacitor having a positive electrode, coupled to the second terminal of the first induction coil, and a negative electrode, the first capacitor to provide a substantially constant voltage across the positive and negative electrodes;

a second diode having an anode and a cathode;

a second induction coil coupled to the negative electrode of the first capacitor and to the cathode of the second diode;

a measurement resistor coupled between the anode of the second diode and the second input terminal;

a second capacitor having a negative electrode, coupled to the anode of the second diode, and a positive electrode; and a third diode having an anode coupled to the negative electrode of the first capacitor, and a cathode coupled to the positive electrode of the second capacitor.

2. The supply device of claim 1, wherein the control circuit includes a pulse width modulator.

3. The supply device of claim 1, wherein the control circuit generates the control voltage to have a cyclical ratio that is constant when the peak input voltage remains constant.

4. The supply device of claim 3, wherein the control circuit generates the control voltage to have a cyclical ratio that is a function of a current flowing through the measurement resistor.

5. The supply device of claim 2, wherein the control circuit comprises:

a voltage comparator having a positive input coupled to the measurement resistor, a negative input coupled to a reference voltage source, and an output to provide an output signal; and an RS flip-flop circuit having a set input to receive a clock signal, a reset input coupled to the output of the voltage comparator, and a Q output coupled to the input of the power switch.

6. The supply device of claim 1, wherein the control circuit generates the control voltage to have a cyclical ratio that varies as a function of the amplitude of the voltage between the first input terminal and the second input terminal.

7. The supply device of claim 6, wherein the control circuit comprises:

a low gain inverting amplifier having a positive input to receive a reference voltage, a negative input coupled to at least one of the first and second input terminals to receive the rectified AC input voltage, and an output to provide a reference signal;

a voltage comparator having a positive input coupled to the measurement resistor, a negative input coupled to the output of the low gain inverting amplifier, and an output to deliver an output signal; and an RS flip-flop circuit having a set input to receive a clock signal, a reset input coupled to the output of the voltage comparator, and a Q output coupled to the input of the power switch.

8. The supply device of claim 1, wherein the power switch is a MOSFET type power transistor.

9. The supply device of claim 1, wherein the first induction coil, the second induction coil, the first capacitor, the second capacitor and the resistor are sized so that the first induction coil operates in a discontinuous mode.

10. A power supply circuit for providing power to a load from an alternating current power supply, the power supply circuit comprising:

a rectifier to rectify a power signal received from the alternating current power supply;

a first output terminal and a second output terminal to provide power to the load;

a first inductor coupled to the rectifier to receive and store energy from the rectified power signal;

a first capacitor, having a first terminal and a second terminal, the first capacitor coupled to the first inductor to receive and store energy from the first inductor, the first capacitor having sufficient capacitance to maintain an approximately constant voltage at the first terminal and the second terminal for a fixed peak voltage appearing across the rectifier;

an energy storage element, coupled to the first capacitor and the first and the second output terminals, to store energy received from the first capacitor and transfer the energy stored in the energy storage element to the load; and a switch to control charging and discharging of the first capacitor.

11. The power supply circuit of claim 10, wherein the energy storage element comprises a second inductor.

12. The power supply circuit of claim 10, wherein:

the first capacitor and the first inductor are coupled in series between the rectifier and the first output terminal; and the energy storage element is coupled to the rectifier in parallel with the first and second output terminals.

13. The power supply circuit of claim 12, wherein the energy storage element comprises a second inductor and a second capacitor, coupled in parallel.

14. The power supply circuit of claim 11, further comprising:

a measurement circuit to measure a current through the second inductor; and a switch control circuit, coupled to the measurement circuit and the switch, to control the switch in response to the current through the second inductor.

15. The power supply circuit of claim 14, wherein the switch control circuit includes a pulse modulating circuit to produce a signal having a cyclical ratio that is fixed when the alternating current supply has a fixed peak voltage.

16. The power supply circuit of claim 14, wherein the switch control circuit includes a pulse modulating circuit to produce a signal having a cyclical ratio that varies with a voltage at the rectifier during a cycle of the alternating current supply.

17. The power supply circuit of claim 14, wherein the measurement circuit includes a circuit to provide a measurement voltage proportional to the current through the second inductor; and wherein the switch control circuit comprises:

a voltage comparator having a first input coupled to the measurement circuit to receive the measurement voltage, a second input to receive a reference voltage and an output.

18. The power supply circuit of claim 17, further comprising a reference voltage circuit, coupled to the second input of the voltage comparator, to generate the reference voltage to vary, when the alternating current supply is coupled to the rectifier, in response to variations in a voltage that appears across the rectifier during a cycle of the alternating current source.

19. A supply circuit, comprising:
a first input terminal and a second input terminal;
a first output terminal coupled to the first input terminal;
a second output terminal coupled to the second input terminal;
a first inductor coupled to the first and second input terminals in parallel with the first and second output terminals; and
a current control circuit, coupled to the first inductor in parallel with the first and second input terminals, to control a current through the first inductor.

20. The circuit of claim 19, further comprising:
a capacitor coupled to the first inductor in parallel with the first and second output terminals.

21. The circuit of claim 20, wherein the current control circuit comprises:
a measurement circuit to measure a current in the first inductor; and
a circuit, responsive to the measurement circuit, to selectively direct current through the first inductor.

22. The circuit of claim 21, wherein the circuit to selectively direct comprises:
a switch, coupled to the first and second input terminals and in parallel with the first inductor, that is operable in response to an activation signal; and
a switch control circuit, coupled to the measurement circuit and to the switch, to provide the activation signal in response to the current measured in the first inductor.

23. The circuit of claim 22, wherein the switch control circuit includes a pulse modulating circuit to produce the activation signal to have a cyclical ratio that is fixed when a fixed peak alternating current supply is coupled to the first and second input terminals.

24. The circuit of claim 22, wherein the switch control circuit includes a pulse modulating circuit to produce the activation signal to have a cyclical ratio that varies, when an alternating current supply is coupled to the first and second input terminals, in response to variation of a voltage across the first and second input terminals during a cycle of the alternating current supply.

25. The circuit of claim 22, wherein the measurement circuit includes a circuit to provide a measurement voltage proportional to the current through the first inductor and wherein the switch control circuit comprises:
a comparator having an input coupled to the measurement circuit to receive the measurement voltage, an input to receive a reference voltage and an output.

26. The circuit of claim 25, further comprising a reference voltage circuit, coupled to the second input of the voltage comparator, the reference voltage circuit comprising a circuit to generate the reference voltage to vary, when an alternating current source is coupled to the first and second input terminals, in response to variation of a voltage that appears across the first and second input terminals during a cycle of the alternating current source.

27. The circuit of claim 26, wherein the reference voltage circuit comprises:
a low gain operational amplifier circuit having a first input to receive an input reference voltage and a second input to receive a voltage proportional to the voltage across the first and second input terminals.

28. The circuit of claim 25, wherein the switch control circuit further comprises:
an RS flip-flop having a set input to receive a clock signal, a reset input coupled to the output of the comparator and an output to provide the activation signal.

29. The circuit of claim 22, wherein the circuit to selectively direct further comprises:
a second inductor coupled in series between the switch and the first input terminal; and
a second capacitor coupled in series with the switch and the first inductor, the second capacitor being further coupled to the second inductor to store energy from the second inductor and to provide energy to the first inductor.

30. The circuit of claim 29, wherein the switch control circuit comprises a current comparator to compare current passing through the first inductor to a reference value.

31. The circuit of claim 29, wherein:
the current comparator comprises a resistor, coupled in series with the switch and the first inductor, to provide a measurement voltage proportional to the current through the first inductor; and
the switch control circuit comprises a voltage comparator having a first input coupled to the resistor to receive the measurement voltage, a second input to receive a reference voltage and an output to provide the activation signal.

32. The circuit of claim 31, wherein the second capacitor is a chemical capacitor that has a terminal coupled to a mid-point of the second inductor.

33. The circuit of claim 31, further comprising a reference voltage circuit, coupled to the second input of the voltage comparator, the reference voltage circuit comprising:
a circuit to generate the reference voltage to vary, when an alternating current source is coupled to the first and second input terminals, in response to variation of a voltage that appears across the first and second input terminals during a cycle of the alternating current source.

34. The circuit of claim 33, wherein the circuit to generate a reference voltage comprises:
a low gain operational amplifier circuit having a first input coupled to an input reference voltage and a second input to receive a voltage proportional to the voltage across the first and second input terminals.

35. A supply circuit, comprising:
a first input terminal and a second input terminal;
a first output terminal coupled to the first input terminal;
a second output terminal coupled to the second input terminal;
an energy storage circuit coupled to the first and second input terminals; and
a current control circuit, coupled to the energy storage circuit, to limit current flowing through the energy storage circuit to a reference amount.

36. The circuit of claim 35, wherein the current control circuit comprises a circuit to measure current passing through the energy storage circuit.

37. The circuit of claim 36, wherein the current control circuit further comprises:
a switch, having an coupled to the first input terminal, the second input terminal and the energy storage circuit, and operable in response to an activation signal; and
a switch control circuit, coupled to the switch, to provide the activation signal.

38. The circuit of claim 37, wherein the circuit to measure comprises a resistor coupled in series with the switch and the energy storage circuit; and wherein the switch control circuit comprises:
a voltage comparator having a first input coupled to the resistor, a second input to receive a reference voltage and an output that provides the activation signal.

39. The circuit of claim 38, further comprising a reference voltage circuit, coupled to the second input of the voltage comparator, the reference voltage circuit comprising:

a circuit to generate the reference voltage to vary, when an alternating current source is coupled to the first and second input terminals, in response to variation of a voltage that appears across the first and second input terminals during a cycle of the alternating current source.

40. A supply circuit, comprising:

a first input terminal and a second input terminal;

a first output terminal coupled to the first input terminal;

a second output terminal coupled to the second input terminal;

an energy storage circuit coupled to the first and second input terminals; and means, coupled to the energy storage circuit, for limiting a current passing through the energy storage circuit to a reference amount.

41. The circuit of claim 40, wherein the energy storage circuit comprises an inductor.

42. The circuit of claim 40, wherein the means for limiting includes means for measuring current through the energy storage circuit.

43. The circuit of claim 40, wherein the means for limiting includes:

means, responsive to the current passing through the energy storage circuit, for selectively applying a voltage across the energy storage element to provide energy to the energy storage circuit.

44. The circuit of claim 43, wherein the means for selectively applying includes:

a switch coupled to the first input terminal and the energy storage circuit; and control means, responsive to current passing through the energy storage circuit, for activating and deactivating the switch according to a fixed cyclical ratio.

45. The circuit of claim 43, wherein the means for selectively applying includes:

a switch coupled to the first input terminal and the energy storage circuit; and control means, responsive to current passing through the energy storage circuit, for activating and deactivating the switch according to a varying cyclical ratio.

46. The circuit of claim 45, wherein the control means comprises means for increasing the cyclical ratio when a voltage across the first and second input terminals decreases.

47. The circuit of claim 45, wherein the control means comprises means for decreasing the cyclical ratio when a voltage across the first and second input terminals increases.

48. A method of supplying power to a load from an input power source, the method comprising steps of:

(A) delivering current from the input power source to an energy storage device;

(B) limiting the amount of current passing through the energy storage device to a reference amount; and (C) providing energy stored in the energy storage device to the load.

49. The method of claim 48, wherein the step (A) includes steps of:

charging an inductor from the input power source;

transferring energy from the inductor to a capacitor; and delivering current from the capacitor to the energy storage device.

50. The method of claim 48, wherein the step (C) includes steps of:

transferring energy from the energy storage device to a capacitor; and coupling the capacitor to the load.

51. The method of claim 48, wherein the steps (A) and (B) include a step of:

(D) alternately coupling a charge voltage received from the input power supply across the energy storage device to deliver current to the energy storage device and uncoupling the charge voltage from the energy storage device to limit the amount of current passing through the energy storage device to the reference amount.

52. The method of claim 51, wherein:

the step (A) includes steps of:

storing energy from the input power source in an inductor, transferring energy from the inductor to a first capacitor, and transferring energy from the first capacitor to the energy storage device; and the step (C) includes steps of transferring energy from the energy storage device to a second capacitor, and coupling the capacitor to the load.

53. The method of claim 51, wherein the step (D) includes a step of alternately coupling and uncoupling the charge voltage across the energy storage device according to a fixed cyclical ratio.

54. The method of claim 51, wherein the input power source is an alternating current power supply;

wherein the step (A) includes a step of delivering current from the alternating current power supply to the energy storage device; and wherein the step (D) includes a step of alternately coupling and uncoupling a charge voltage across the energy storage device according to a cyclical ratio that varies during a cycle of the alternating current power supply.

55. The power supply circuit of claim 10, wherein the first capacitor is a chemical capacitor.

* * * * *